W. R. HERSH.
APPARATUS FOR CHARGING STORAGE BATTERIES.
APPLICATION FILED APR. 12, 1920.
1,389,871.
Patented Sept. 6, 1921.
2 SHEETS—SHEET 2.
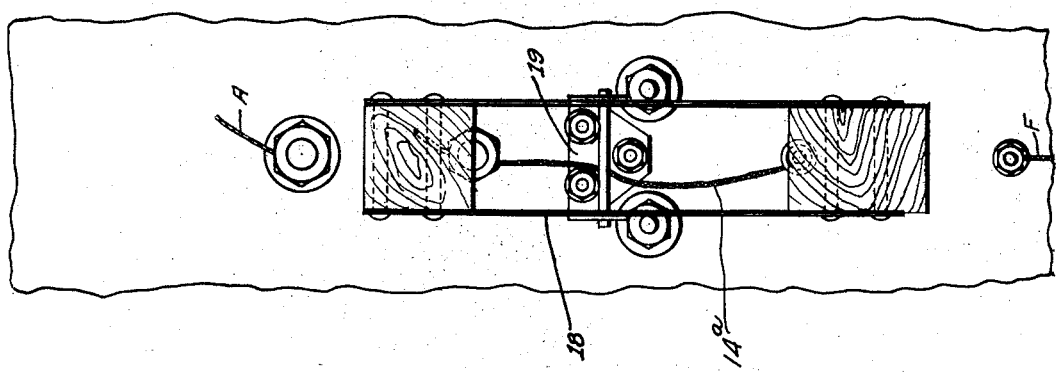
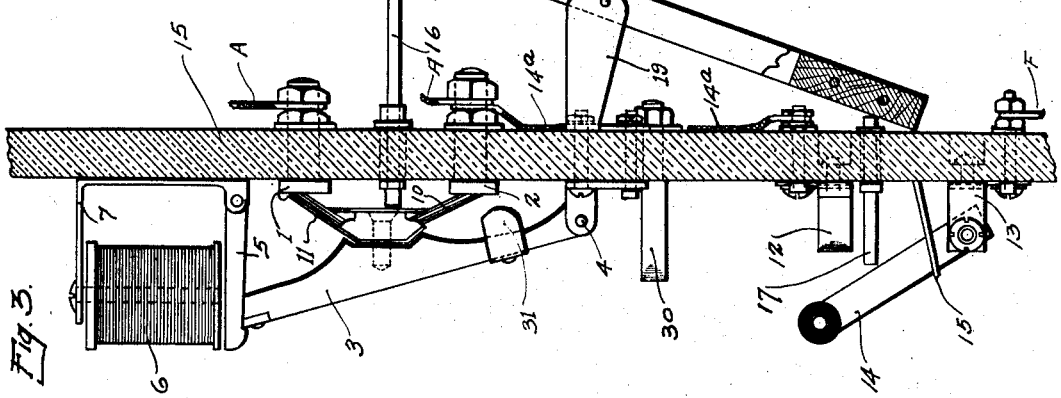
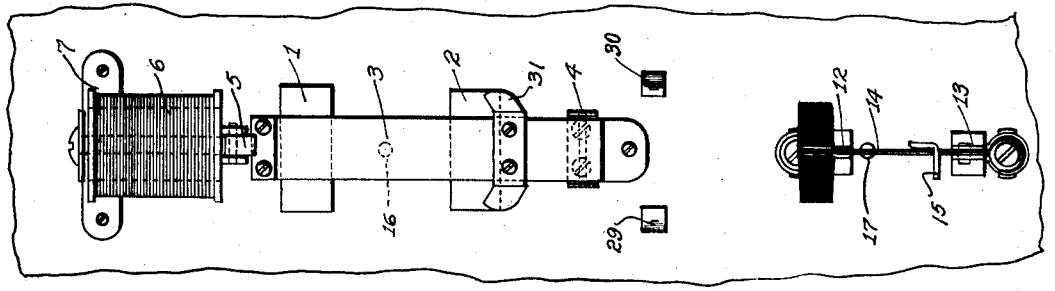
INVENTOR.
W. R. HERSH.
BY Edward L. Reed
ATTORNEY

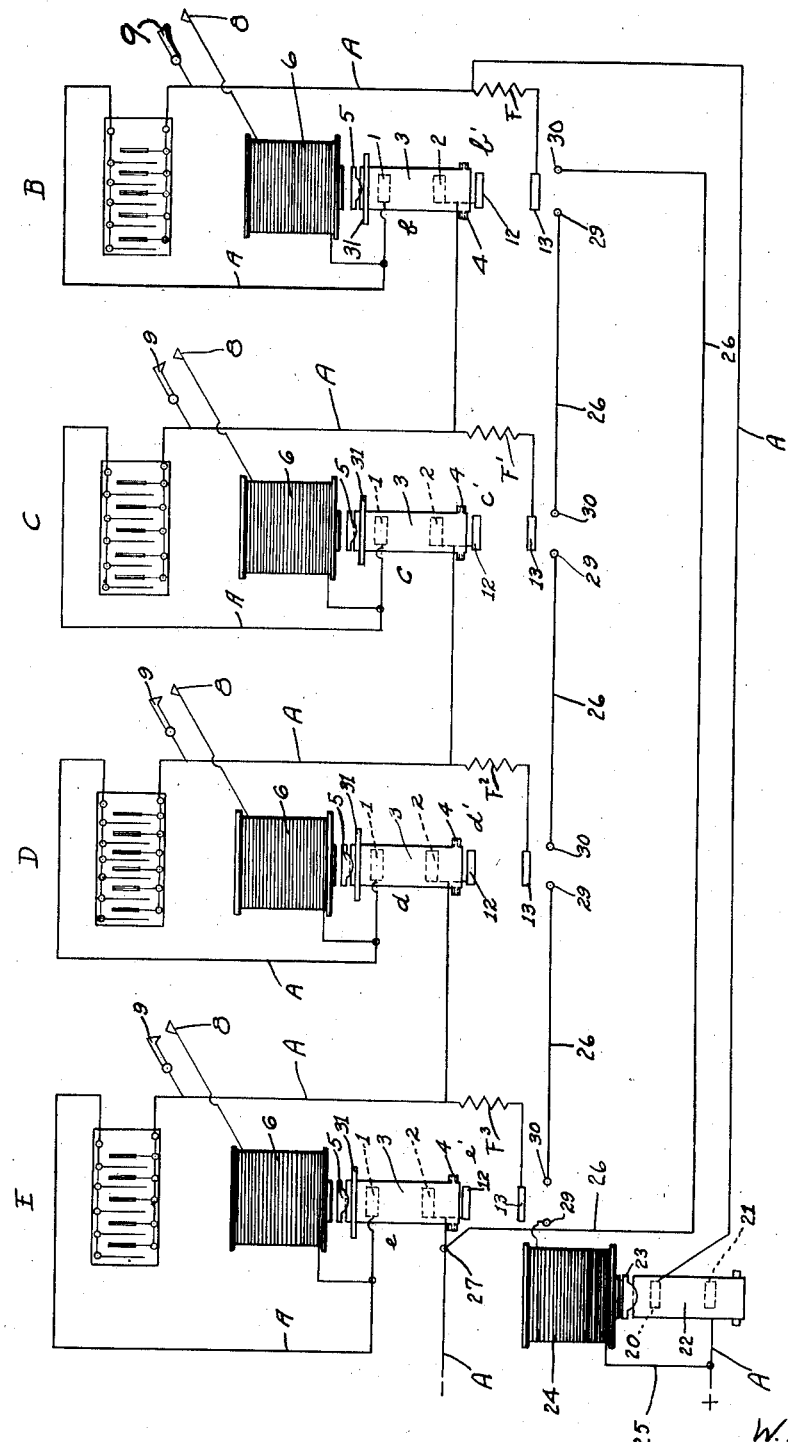

UNITED STATES PATENT OFFICE.

WILLIAM R. HERSH, OF DAYTON, OHIO.

APPARATUS FOR CHARGING STORAGE BATTERIES.

1,389,871.   Specification of Letters Patent.   Patented Sept. 6, 1921.

Application filed April 12, 1920. Serial No. 373,120.

*To all whom it may concern:*

Be it known that I, WILLIAM R. HERSH, a citizen of the United States, residing at Dayton, in the county of Montgomery and State of Ohio, have invented certain new and useful Improvements in Apparatus for Charging Storage Batteries, of which the following is a specification, reference being had therein to the accompanying drawing.

This invention relates to an apparatus for charging storage batteries.

The object of the invention is to provide such an apparatus which will permit a plurality of batteries to be connected in series in the main circuit and which will automatically disconnect the several batteries when they have received a predetermined charge and will substitute in the circuit, for each battery disconnected sufficient resistance to maintain the current uniform at the other batteries.

A further object of the invention is to provide such a device having means for automatically interrupting the main circuit when the last storage battery has been disconnected therefrom, irrespective of the sequence in which the several batteries are disconnected from the main circuit.

A further object of the invention is to provide an automatic circuit breaker and closer of simple construction and of such a character that it will efficiently control the circuits for the respective batteries.

Other objects of the invention will appear as the apparatus is described in detail.

In the accompanying drawings, Figure 1 is a diagrammatical view of the apparatus and circuits; Fig. 2 is a front elevation of one of the circuit breakers; Fig. 3 is a side elevation of the apparatus of Fig. 2 with the base in section; and Fig. 4 is a rear view of the circuit breaker and closer.

In carrying out my invention I provide means for connecting in the main circuit in series a plurality of storage batteries, such for example as the storage batteries for industrial trucks which are usually charged once a day and of which many industrial establishments use large numbers. I provide in the circuit an automatic device for controlling the charging of each battery and for disconnecting each battery from the main circuit, when the battery has received a predetermined charge, and for connecting in the circuit in lieu of the battery, after the same has been disconnected therefrom, sufficient resistance to compensate for the disconnected battery and to maintain the current uniform at the remaining batteries which are being charged. The main circuit is provided with an automatic circuit breaker having a circuit which is provided with a circuit breaker and closer for each battery, the circuit breakers and closers being of such a character that when any one of the batteries is disconnected form the main circuit the corresponding circuit breaker in the circuit for the main line circuit breaker and closer will be closed at that point, consequently when all the batteries have been disconnected this circuit will be completely closed and the circuit breaker and closer for the main circuit will be operated to break that circuit. The character of the apparatus and the arrangement of the circuits for accomplishing these results may take various forms and the construction and arrangement here shown have been chosen for the purpose of illustration only.

In that embodiment of the invention here illustrated I have shown the main circuit at A and have shown connected in this circuit in series a plurality of storage batteries, B, C, D and E. Between each storage battery and the next succeeding battery is interposed an automatic circuit breaker and closer, $b$, $c$, $d$ and $e$, which will be operated to disconnect that battery from the main circuit when the battery has received a predetermined charge. I have also provided for each battery a resistance circuit, F, F', $F^2$ and $F^3$, which is connected across the main circuit on opposite sides of the storage battery and is provided with a circuit breaker and closer, $b'$, $c'$, $d'$, and $e'$, which is open when the circuit breaker and closer in the battery circuit is closed and will be closed when the last mentioned circuit breaker and closer is open, thus cutting the resistance into the main circuit when the battery is cut out of the main circuit. As here shown, the two circuit breakers are embodied in a single apparatus and the circuit breaker and closer for the batteries, $b$, $c$, $d$ and $e$, each comprise two fixed contacts, 1 and 2, which are connected with the main circuit and electrically disconnected one from the other. A movable contact member 3 is provided to connect and disconnect the contact members 1 and 2. As here shown, this movable contact member is in the form of a drop which is pivotally supported at 4 below the contact member 2 and is held normally in its uppermost, or closed, position by means of a latch 5 which constitutes the armature for a magnet 6 which is adapted to be connected in the main circuit when the battery has received a predetermined charge and to be thus energized to actuate the latch 5 and release the drop 3 thereby permitting the latter to move away from the contacts 1 and 2 and break the circuit through the battery. The magnet may be connected in the main circuit in any suitable manner, preferably however, one end of the winding is grounded on the core, which is connected through a supporting bracket 7, latch 5 and drop 3 with the main circuit. The other end of the winding leads to a controlling device where it is provided with a fixed contact member 8 arranged to be engaged by a movable contact member 9 which is connected with the main circuit and which will be operated when the battery has received the desired charge. This movable contact member 9 may be actuated by any suitable means, such as an ampere hour meter or a clock mechanism. In the one instance the contacts will be closed when a measured charge has been delivered to the battery and in the other it will be operated when the circuit has been connected with the battery for a predetermined period of time. As here shown, the movable contact member is adapted to be connected with the contact of an ampere hour meter consequently when the battery has received the desired charge the contact 9 will engage the contact 8, causing the magnet 6 to be energized and the drop 3 to be released. The drop 3 may come directly in contact with the fixed contact members 1 and 2 but in the construction here shown I have provided the drop on its inner face with yieldable contact members 10 which will engage the contact members 1 and 2 with a firm contact, thereby insuring a proper closing of the circuit. I also prefer to provide the drop with a spring 11 which bears against a fixed part of the apparatus, in the present instance, the plate constituting the fixed contact 1, and which will be placed under tension when the drop is in its closed position and which when the drop is released will impart initial movement thereto, thereby effecting a prompt breaking of the circuit. The circuit breakers and closers for the resistance circuits, $b'$, $c'$, $d'$ and $e'$, comprise fixed contact members 12 and 13, the contact members 13 being connected with the respective resistance circuits and the contact members 12 being connected with the main circuit, preferably by connecting them with the fixed contact members 2 of the circuit breakers $b$, $c$, $d$ and $e$, by means of conductors 14$^a$. The contacts 12 and 13 are adapted to be closed by the action of the circuit breaker for the battery circuits, $b'$, $c'$, $d'$ and $e'$. The drop 3 may directly engage the contact members 12 and 13 but I prefer that these circuit breakers and closers shall be in the form of knife switches, the movable member 14 of which is so arranged that it will be engaged by the drop 3 as the latter moves downwardly and will be moved thereby into engagement with the fixed contact 12. A supporting device such as a hook 15 may be provided to support the movable member 14 in its proper position to be engaged by the drop 3. It will be apparent therefore that when the magnet 6 is energized and the drop 3 released that the circuit through the battery will first be broken and then the resistance circuit closed, the two operations being separated by a very brief interval of time.

I have also provided means for preventing the circuit breakers for the battery circuit and for the resistance circuit, of any one battery, being closed at the same time, and to this end I have slidably mounted on the base 15, upon which the apparatus is mounted, pins 16 and 17 which are arranged in the paths of the end portions of a rock arm, or lever, 18, which is pivotally mounted on a suitable bracket 19 secured to the rear wall of the base. The pins are so arranged with relation to the lever 18 and to the movable members of the two circuit breakers that when the movable member of one circuit breaker is in its closed position the pin for that circuit breaker will hold the lever 18 in such a position that the pin for the movable member of the other circuit breaker will lie in the path of said movable member and prevent the same from being moved to its closed position before the movable member of the first mentioned circuit breaker is actuated. With the circuit breaker and closer for the battery circuit in its closed position, as shown in Fig. 3, the circuit breaker and closer for the resistance circuit is locked in its open position because the drop 3 cannot be actuated until the magnet 6 is energized. When the circuit breaker and closer for the battery circuit is in its open position and the circuit breaker and closer for the resistance circuit is in its closed position the movement of the drop 3 to its closed position will automatically move the member 14 of the circuit breaker and closer for the resistance circuit into its open position.

I have also provided means for automatically interrupting the main circuit when all the batteries have been charged. To this end I have interposed in the main circuit an electrically controlled circuit breaker which, as here shown, comprises fixed contact members 20 and 21 and a pivoted drop 22 which is held in its closed position by a latch 23 which constitutes the armature for a magnet 24. The arrangement of the fixed contacts and of the drop and its latch may be similar to those shown and described in connection with the circuit breakers and closers for the battery circuits. The one end of the winding of the magnet 24 is connected with the main circuit as shown at 25, preferably by grounding the same through the core of the magnet, as described in connection with the magnets 6, and the other end of the winding is connected with a circuit 26 which is connected with the main circuit at 27. The circuit 26 is provided with a separate circuit breaker and closer for each battery and these circuit breakers and closers are so constructed and arranged that each of them will be closed when the corresponding battery is cut out of the main circuit. This may be accomplished in various ways but I have here shown each circuit breaker and closer for the magnet circuit 26 as comprising fixed contact members 29 and 30, arranged to be engaged by a contact member 31 carried by the drop 3 when the latter is in its open position, this contact member serving to electrically connect the two fixed contact members 29 and 30 one with the other. It will be apparent therefore that the magnet circuit 26 will be broken until the last battery has been charged and the drop 3 of its circuit breaker has moved to its lowermost position, and that when the last battery has been so charged the magnet circuit 26 will be completely closed, the magnet 24 energized and the circuit breaker and closer for the main circuit operated to break the circuit.

In the operation of the device it will be understood that when the several batteries B, C, D and E have been connected into the main circuit A, that the resistance circuits F, F', F², and F³ will be broken, as will also the magnet circuit 26. Consequently the current will flow through the main circuit, through the battery B and its circuit breaker and closer *b* to the battery C, then through its circuit breaker and closer *c* to the battery D, through its circuit breaker and closer to the battery E, and through its circuit breaker and closer *e* to the main circuit. It is immaterial how many batteries are connected into the circuit or in what sequence the charging of the same is completed. When one of the batteries, for example battery B, has received the desired charge, the contact member 9 of the circuit for the magnet 6 will engage the contact member 8 thus connecting the magnet 6 into the circuit and causing the same to be energized. The energization of the magnet 6 actuates the latch 5 to release the drop 3 thereby breaking the circuit through the battery B and inasmuch as the magnet circuit is grounded through the core of the magnet and the latch 5 this circuit will also be broken and the magnet deënergized. As the drop moves downward it engages the movable member 14 of the switch *b'* for the resistance circuit F and closes this switch, thereby cutting into the circuit an amount of resistance which will compensate for the battery which has been cut out of the circuit, thus maintaining a substantially uniform flow of current at the remaining batteries. The interval between the breaking of the battery circuit and the closing of the resistance circuit is so short as to have no appreciable effect upon the current at the other batteries, the ammeter needle showing merely a slight fluctuation and immediately returning to normal. The downward movement of the drop also causes the contact member 31 to engage the contact members 29 and 30 of the circuit 26 for the magnet 24 of the circuit breaker and closer in the main circuit, thus closing the circuit at this point. This operation will be repeated at the respective batteries as the charging of each battery is completed and when the last battery has been charged the magnet circuit 26 will be completely closed and the circuit breaker and closer for the main circuit operated to interrupt that circuit.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In an apparatus of the character described, a main circuit having means for connecting a plurality of storage batteries therein in series, a resistance circuit for each storage battery, and means controlled by the respective storage batteries and operating automatically to disconnect said storage batteries individually from said main circuit when each storage battery has received a predetermined charge, to connect the corresponding resistance circuits with said main circuit as the respective storage batteries are disconnected therefrom, to maintain the current uniform at the storage batteries which have not been disconnected, and to interrupt said main circuit after the last storage battery has been disconnected therefrom.

2. In an apparatus of the character described, a main circuit having means for connecting a plurality of storage batteries therein in series, a circuit breaker and closer for each storage battery, a resistance circuit for each storage battery, a circuit breaker and closer to connect said resistance circuit across the main circuit, a circuit breaker and closer for the main circuit, an actuating device for the last mentioned circuit breaker and closer comprising a circuit having a circuit breaker and closer arranged adjacent to the circuit breakers and closers for each battery, and means controlled by the operation of the circuit breakers and closers for each battery to close the respective circuit breakers and closers of the circuit for said actuating device.

3. In an apparatus of the character described, a main circuit having means for connecting a plurality of storage batteries therein in series, a circuit breaker and closer for connecting each battery in the main circuit, each circuit breaker and closer comprising a drop, a magnet to control said drop, and means for energizing said magnet when said battery has received a predetermined charge, a resistance circuit for each battery, a circuit breaker and closer to connect said resistance circuit into the main circuit, said last mentioned circuit breaker and closer comprising a movable member arranged to be engaged by said drop and moved into its closed position, a circuit breaker and closer for the main circuit, a magnet to control said last mentioned circuit breaker and closer, a circuit for said last mentioned magnet, and a circuit breaker and closer for said last mentioned magnet circuit for each battery, said last mentioned circuit breaker and closer comprising a part actuated by the drop of the first mentioned circuit breaker and closer.

In testimony whereof, I affix my signature hereto.

WILLIAM R. HERSH.